(12) United States Patent
Roos (10) Patent No.: US 11,971,005 B2
(45) Date of Patent: Apr. 30, 2024

(54) HYDROKINETIC POWER-GENERATION TURBINE SYSTEMS USING ELECTRONIC TORQUE CONTROL

(71) Applicant: AMJET Turbine Systems, LLC, Keokuk, IA (US)

(72) Inventor: Paul W. Roos, Delray Beach, FL (US)

(73) Assignee: AmJet Turbine Systems, LLC, Keokuk, IA (US)

( * ) Notice: Subject to any disclaimer, the term of this patent is extended or adjusted under 35 U.S.C. 154(b) by 0 days.

(21) Appl. No.: 17/330,174

(22) Filed: May 25, 2021

(65) Prior Publication Data

US 2021/0372360 A1 Dec. 2, 2021

Related U.S. Application Data

(60) Provisional application No. 63/030,087, filed on May 26, 2020.

(51) Int. Cl.
*F03B 13/10* (2006.01)
*F03B 15/00* (2006.01)
*H02K 7/18* (2006.01)

(52) U.S. Cl.
CPC .............. *F03B 13/10* (2013.01); *F03B 15/00* (2013.01); *H02K 7/1823* (2013.01)

(58) Field of Classification Search
CPC ........ F03B 13/10; F03B 15/00; H02K 7/1823
USPC ......................................... 290/43, 54, 42, 53
See application file for complete search history.

(56) References Cited

U.S. PATENT DOCUMENTS

| | | | | |
|---|---|---|---|---|
| 4,737,070 A | * | 4/1988 | Horiuchi | F03B 17/063 415/4.1 |
| 6,091,161 A | * | 7/2000 | Dehlsen | F03B 13/10 290/43 |
| 7,291,936 B1 | * | 11/2007 | Robson | F03B 17/061 290/43 |
| 8,536,723 B2 | | 9/2013 | Roos | |
| 8,963,356 B2 | | 2/2015 | Roos | |
| 2007/0257492 A1 | * | 11/2007 | Robson | F03B 17/061 290/54 |
| 2007/0284882 A1 | * | 12/2007 | Costin | F03B 17/061 290/43 |
| 2010/0019499 A1 | * | 1/2010 | Perner | F03B 17/061 290/53 |
| 2010/0084862 A1 | * | 4/2010 | Unno | F03B 17/063 290/43 |
| 2010/0276942 A1 | * | 11/2010 | Hicks | F03D 15/00 475/150 |

(Continued)

FOREIGN PATENT DOCUMENTS

| | | | | |
|---|---|---|---|---|
| FR | 2956167 A1 | * | 8/2011 | ............ F03B 13/264 |
| GB | 2441821 A | * | 3/2008 | ............ F03B 13/183 |

(Continued)

*Primary Examiner* — Charles Reid, Jr.
(74) *Attorney, Agent, or Firm* — Jansson Munger McKinley & Kirby Ltd.

(57) ABSTRACT

In a hydrokinetic turbine-generator system having more than one turbine-generators aligned into a water stream for conversion of hydrokinetic energy to electrical energy, the improvement wherein the more than one turbine-generators are direct-drive electrical generators configured to control generator current such that residual torque on the system is balanced using electronic torque control.

10 Claims, 13 Drawing Sheets

(56) References Cited

U.S. PATENT DOCUMENTS

| | | | | |
|---|---|---|---|---|
| 2011/0285136 A1* | 11/2011 | Desmeules | ............ | F03B 17/061 |
| | | | | 290/54 |
| 2012/0074712 A1* | 3/2012 | Bursal | ..................... | F03D 9/25 |
| | | | | 290/55 |
| 2014/0138954 A1* | 5/2014 | Antonucci | ............ | F03B 17/062 |
| | | | | 290/54 |
| 2014/0284932 A1* | 9/2014 | Sharkh | ................... | F03D 15/10 |
| | | | | 290/54 |
| 2016/0327014 A1* | 11/2016 | Trevarthen | ............ | F03B 13/264 |
| 2016/0333848 A1* | 11/2016 | Rhymes | ................. | F03B 15/16 |
| 2018/0097427 A1* | 4/2018 | Auker | ................. | H02K 7/1823 |
| 2018/0195582 A1* | 7/2018 | Han | ....................... | F16H 3/724 |

FOREIGN PATENT DOCUMENTS

| | | | | |
|---|---|---|---|---|
| GB | 2460309 A | * 12/2009 | ............ | F03B 13/264 |
| WO | WO-2012103654 A1 | * 8/2012 | ............ | B63B 39/03 |

\* cited by examiner

FIG. 1B

SECTION BB (SEE FIG. 1A)

SECTION BB (SEE FIG. 1A)

HYDROKINETIC POWER-GENERATION TURBINE SYSTEMS USING ELECTRONIC TORQUE CONTROL

RELATED APPLICATIONS

This application claims the benefit of U.S. Provisional Application Ser. No. 63/030,087, filed on May 26, 2020, the entire contents of which are incorporated herein by reference.

FIELD OF THE INVENTION

This invention is related generally to the field of electrical power generation and, more specifically, to hydrokinetic turbine systems.

BACKGROUND OF THE INVENTION

The large amounts and availability of energy in streams of flowing water (e.g., rivers and tidal flow) is driving the quest for efficient, low-cost hydrokinetic turbine-generators. A number of systems exist which capture some of this energy, but in general such systems are costly, both in up-front capital as well as operationally. The simplest system is a suspended impeller-driven generation system which is moored by a single tether. Other systems utilize tower support with a swivel-mounted turbine, and the tower absorbs the reaction torque from the impeller.

In spite of the large amounts of kinetic energy in such natural water flows, the energy densities associated with such flows are at the low end of the scale of power generation opportunities, and this low energy density is a main contributor to the poor cost-effectiveness of current hydrokinetic systems.

Traditionally, a hydrokinetic turbine operates with low-velocity water flow and uses long blades on a small body. The reaction torque of the rotor is offset by the mounting method to the bottom of the body of water. The relatively low rotational speed of the turbine requires a gearbox to speed up the rotation of the generator shaft to allow efficient transmission to an electrical energy generator that is small in diameter. Such mechanical devices require frequent maintenance to deal with mechanical wear and tear and failure. The weight of a gearbox and generator is high, requiring a fixed tower, anchored in the waterway bottom, to hold up the turbine via a swivel connection to support the weight, counteract rotor torque and transmit generated electricity, all costly features. Swivels allow turbines to align with the flow direction but can also be points of maintenance.

A single tether anchoring a suspended turbine to a mooring is less costly than a tower supported system. Such a system is, however, unable to offset reaction torque. In certain applications a tower may be used to limit the operating area of a hydrokinetic turbine as well as offsetting the torque.

Because of the high cost and low efficiency of present systems, there is need is a need for hydrokinetic turbine-generators which are low in cost, easy to deploy and maintain, and which improve the operational efficiency of hydrokinetic turbine-generators across the spectrum of operational conditions present in such flows (i.e., water flow speed and direction, corrosion, low energy density).

A primary opportunity to address the cost-effectiveness of hydrokinetic turbine-generator systems is to be able to moor such systems with single-point moorings, and in addition, to be able to moor a multiple-turbine-generator system on a single mooring, thereby increasing even further the cost advantages of such turbine-generator systems.

The present invention meets the challenges of these opportunities by eliminating costly and heavy high-speed generators (i.e., no transmissions) and by utilizing electronic torque control to provide high efficiency across the full operational water-flow speed environment on simple moorings. The common feature of all turbine inventive configurations disclosed herein is the precise control provided by electronically and dynamically fine-tuning torque which results in zero net torque transmitted to the mooring while at the same time dynamically controlling the position and orientation of the turbine-generator system. Another common feature of the inventive turbine-generator system of this invention is that the electromagnetic elements of the generators are located away from the center-of-rotation of the generators and placing direct-drive, variable-speed direct-current (DC) power-generation components outside of the turbine-generator body. This improvement reduces component weight, cost and volume of the electromagnetic components.

OBJECTS OF THE INVENTION

It is an object of the present invention to provide a hydrokinetic turbine-generator system which has lower cost and which results in a levelized-cost-of-energy of the generated power to economically-viable levels.

Another object of this invention is to provide a hydrokinetic turbine-generator system which maintains high efficiency regardless of the velocity of the water passing through the hydrokinetic turbines.

Another object of this invention is to provide a hydrokinetic turbine-generator system having lower weight and thus improved buoyancy.

Another object of this invention is to provide a hydrokinetic turbine-generator system which offsets reaction torque to permit single-point mooring of a suspended buoyant power-generating system.

A further object of this invention to provide a hydrokinetic turbine-generator system which eliminates steering vanes and their requisite control systems by dynamically positioning a multiple-turbine tethered-frame system through the control of the output of each turbine by controlling of the rotational torque (and speed) of each turbine rotor.

Another object of this invention is to provide a hydrokinetic turbine-generator system which prevents the power cable at the base of a tethered mooring on the bottom of the body of water from winding up due to uncontrolled directional flow changes.

It is an object of this invention to reduce the weight of hydrokinetic turbine-generator systems by using high-frequency, variable-torque control using compact, low-weight electronic power and control hardware.

Another object of the invention is to provide a hydrokinetic turbine-generator which allows flexible placement of electronic controls, e.g., at the base of the tether or in the turbine body.

These and other objects of the invention will be apparent from the following descriptions and from the drawings.

SUMMARY OF THE INVENTION

The present invention is an improved hydrokinetic turbine-generator system having one or more turbine-generator aligned into a water stream for conversion of hydrokinetic energy to electrical energy. In this improved turbine-generator system, the one or more turbine-generators are direct-drive electrical generators controlled such that residual torque on the system is balanced using electronic torque control.

In highly-preferred embodiments of the hydrokinetic turbine-generator system, orienting the one or more turbine-generators into the water stream is controlled using electronic torque control.

In other preferred embodiments, one or more pairs of the turbine-generators include two counter-rotating turbine-generators on a common shaft, and in some of these embodiments, each turbine-generator pair has the armatures of each turbine-generator of the pair combined into a single component.

In some highly-preferred embodiments, the direct-drive electrical generators include water-lubricated bearings.

In other preferred embodiments, the system is moored using a single-point mooring.

In certain preferred embodiments, the electronic torque control includes control of system pitch, yaw and roll; in some other preferred embodiments, the electronic torque control includes control of system pitch and roll; and in certain embodiments, the electronic torque control includes control of system yaw.

In highly-preferred embodiments of the hydrokinetic turbine-generator system of this invention, the turbine-generator system includes one or more turbine-generator bodies, and the one or more direct-drive electrical generators are direct-current (DC) power generators located outside of the turbine-generator bodies.

In some highly preferred embodiments, the one or more turbine-generators each have a body, a plurality of turbine blades each having a blade tip, and generator components, and the generator components of each turbine-generator are located outside of its associated body. In some of these highly-preferred embodiments, the generator components are located away from the blade tips.

The terms pitch, roll and yaw as used herein are defined as in the field of aviation. As practical definitions, this is as follows: roll is leaning left or right; pitch is leaning forward or backward; and yaw is turning left or right.

The term "direct-current (DC) power generators" as used herein refers to an electromagnetic and electronic generator system which generates variable-frequency alternating-current (AC) power which is then converted to DC power in the generator electronics. The power is then often converted to AC power at a desired frequency, typically for grid applications. Such DC power generators are well-known in the art. Two documents which illustrate such art are U.S. Pat. No. 8,536,723, filed on Jan. 21, 2010 and titled "Integrated Hydroelectric Power-Generating System and Energy Storage Device" and U.S. Pat. No. 8,963,356, filed on Jan. 23, 2012 and titled "Power Conversion and Energy Storage Device." Both of these patents are included herein by reference in their entirety.

BRIEF DESCRIPTION OF THE DRAWINGS

FIG. 1A' is an enlarged elevation-view drawing of the turbine-generator of FIG. 1A showing a detailed section as indicated.

FIG. 1A" is a further enlarged-view drawing of the section of FIG. 1A'.

FIG. 1B' is an enlarged elevation-view drawing of the turbine-generators of FIG. 1B showing a detailed section as indicated.

FIG. 1C' is an enlarged elevation-view drawing of the turbine-generator of FIG. 1C showing a detailed section as indicated.

DETAILED DESCRIPTION OF PREFERRED EMBODIMENTS

In the figures of this application, not every component of each embodiment (turbine-generator system) of the present invention is shown with a reference number, and like components or elements of these various embodiments are given the same reference numbers.

Figure 1A:
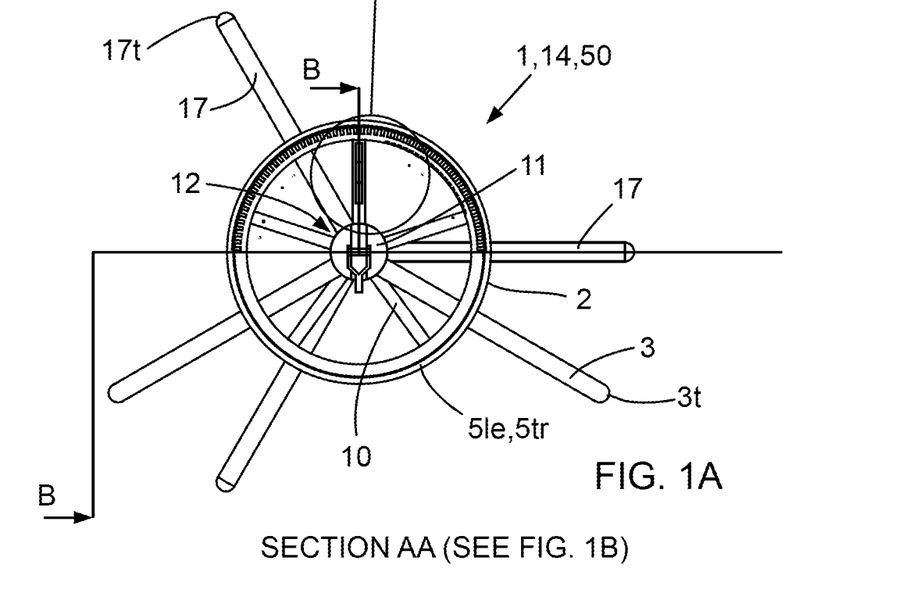
FIG. 1A is an elevation-view drawing (looking downstream) in partial section of one embodiment of the improved hydrokinetic turbine-generator system of this invention. The embodiment of FIG. 1A includes a counter-rotating pair of turbine-generators on a common shaft.
Figure 1B:
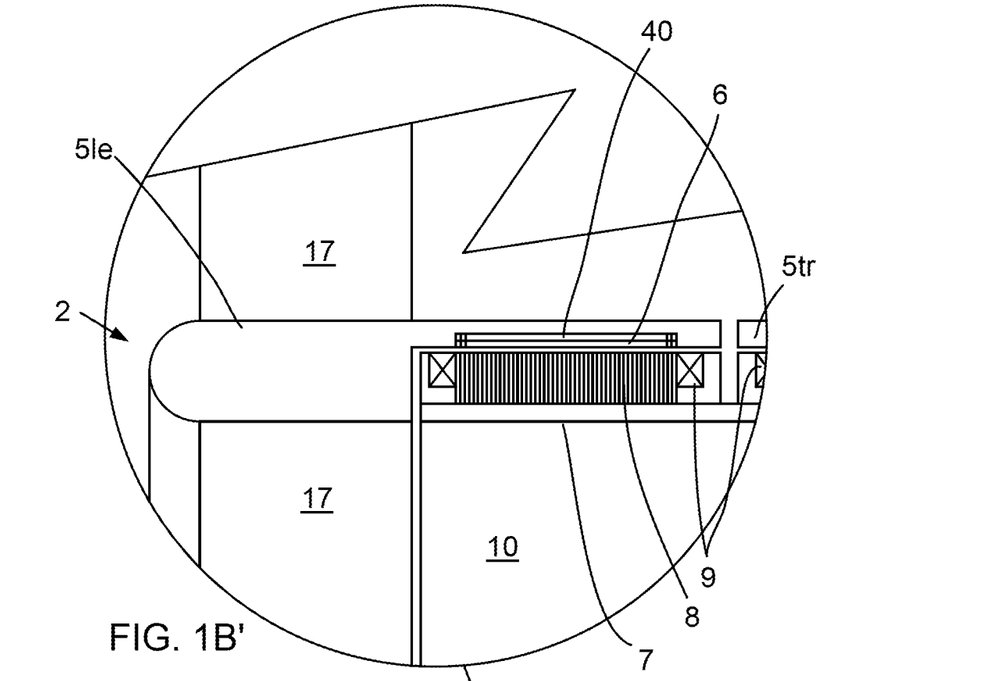
FIG. 1B is a second elevation-view partial section drawing of the turbine-generator system of FIG. 1A.

FIGS. 1A through 1B' illustrate various aspects of one embodiment 50 of the improved hydrokinetic turbine-generator system of this invention. Embodiment 50 includes a counter-rotating pair of turbine-generators (1, 14) on a common shaft 12. FIG. 1A is an elevation-view drawing (looking downstream) in partial section of embodiment 50. (Note that herein reference numbers 1 and 14 refer to trailing turbine-generators and leading turbine-generators, respectively, when such turbines are mounted on a common shaft. For all other instances, single turbine-generators arrayed in the turbine-generator systems disclosed herein are designated by reference number 1.)

FIG. 1A' is an enlarged drawing of a portion of embodiment 50. FIG. 1A" is a further enlarged-view drawing of a portion of FIG. 1A'. FIG. 1B is an elevation-view partial section of turbine-generator system (also 50). FIG. 1B' is an enlarged drawing of a portion of FIG. 1B.

FIG. 1A illustrates the configuration of turbine-generator system 50 including a leading turbine-generator 14 and a trailing turbine-generator 1. Turbine-generators 14, 1 each include a rotor 15, 2 that supports turbine blades 17, 3 positioned advantageously to cause rotors 15, 2 to spin as a result of water flow in a direction 4. Blades 17, 3 have pitch which results in rotors 15, 2 turning in opposite directions from each other. Blades 17, 3 are attached to rotors 15, 2 through hubs 131e, 13tr and bearings 121e, 12tr ("1e" for leading; "tr" for trailing).

An outer rim 5le of leading turbine-generator 14 rotates with rotor blades 17 of rotor 15, and an outer rim 5tr of trailing turbine-generator 1 rotates with rotor blades 3 of rotor 2. As seen in FIG. 1A", inside of outer rim 5le is a back-iron ring 40 to which an array of permanent magnets 6 is attached. Inside of magnets 6 is a gap 41. An armature 7, positioned inside of gap 41, is stationary with respect to outer rims 5le and 5tr, back-iron ring 40 and magnets 6, and is mounted to a body 11 via stator vanes 10. Armature 7 includes lamination stacks 8 and coils 9 shown only in FIG. 1A". Armature 7 is supported by stator vanes 10 and is rigidly attached to body 11.

Bearings 12le, 12tr rotatively support rotors 2, 15 and maintain a close tolerance of gap 41 between permanent magnets 6 (of each turbine-generator) and lamination stacks 8 and coils 9. Note that outer rims 5le, 5tr are placed outside of body 11 away from the tips 3t, 17t of turbine blades 3, 17 (see FIG. 1A) to provide mechanical strength and maintain the tolerance of gap 41. One stator vane 10 (see FIG. 1A') includes mountings for placing a roll sensor, a yaw sensor, and a pitch sensor (18, 19 and 20, respectively) to provide feedback for an electronic controller 26.

Coils 9 and lamination stacks 8 are encapsulated with urethane compound 31 to protect stacks 8 and coils 9 from water. A water-lubricated bearing formed by gap 41 and includes lubricating grooves 30.

Figure 1C:
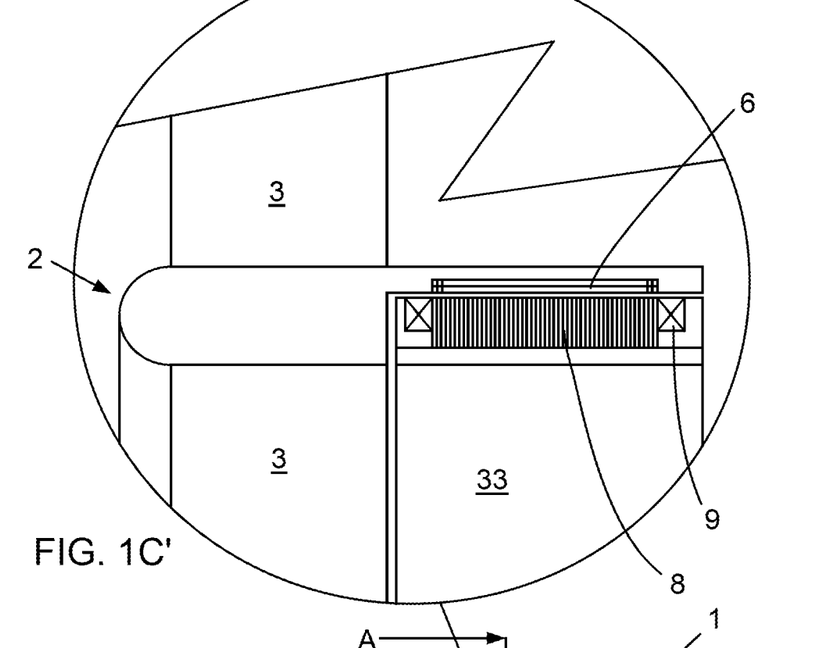
FIG. 1C is an elevation-view partial section drawing of an embodiment of a single improved turbine-generator of this invention.

FIG. 1C is an elevation-view partial section drawing of turbine-generator 1 of this invention, and FIG. 1C' is an enlarged elevation-view drawing of a portion of FIG. 1C. Turbine-generator 1, in similar fashion to the descriptions of embodiment 50, includes rotor 2, body 11, an armature 32, stator vanes 33, bearings 12b and hub 13. The function of these components is identical to those described with respect to the similar components of turbine-generator system 50.

Figure 2A:
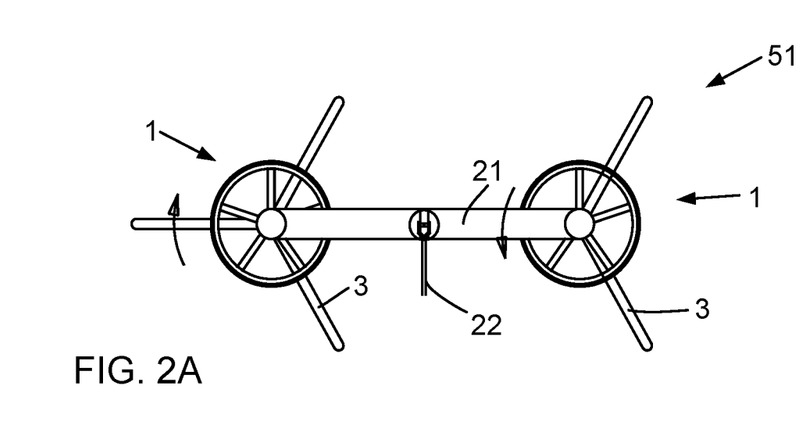
FIG. 2A is an elevation-view drawing (looking downstream) of a second embodiment of the improved turbine-generator of this invention. This second embodiment includes two counter-rotating turbine-generators not on a common shaft.
Figure 2B:
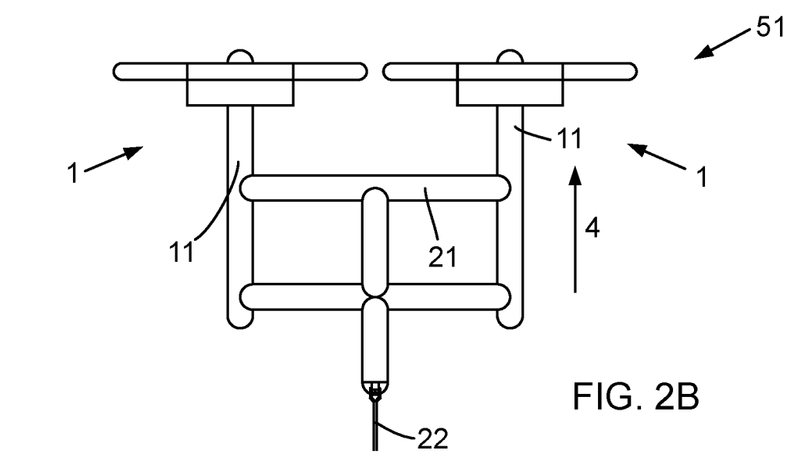
FIG. 2B is a plan-view drawing of the turbine-generator system of FIG. 2A.
Figure 3:
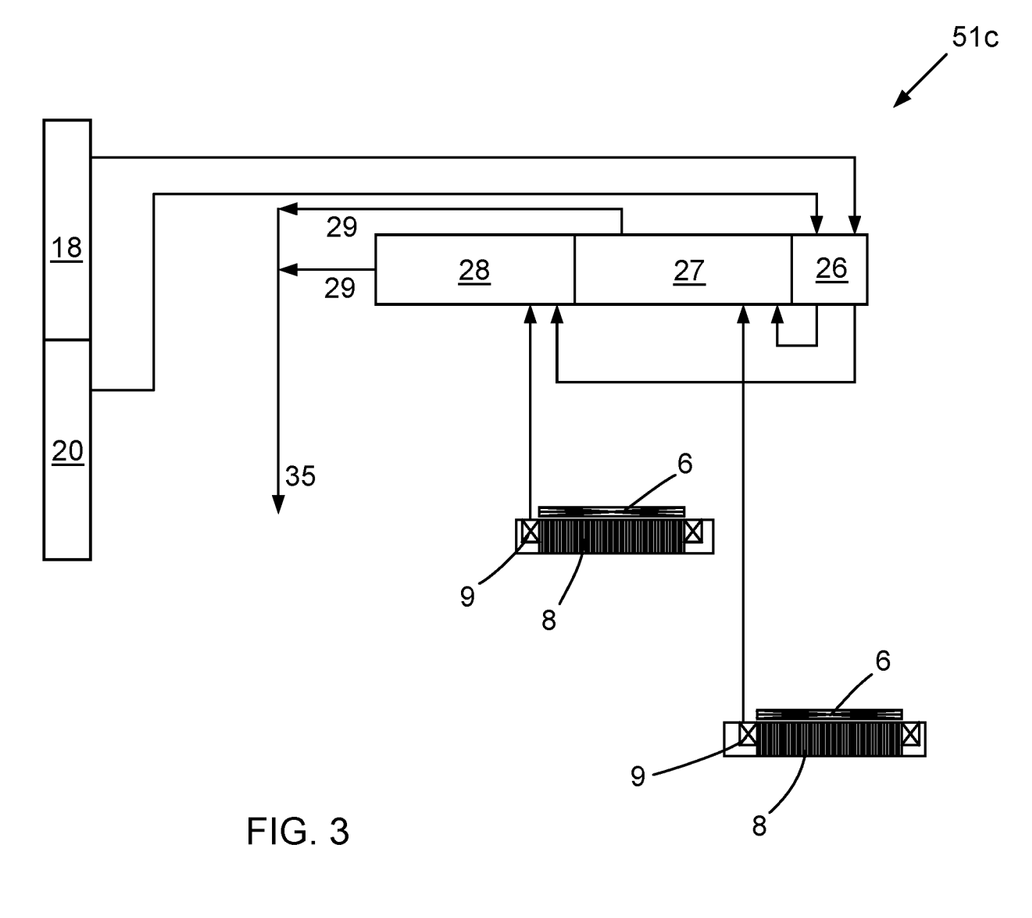
FIG. 3 is a block diagram illustrating the control system for the turbine-generator system of FIG. 2A.

FIG. 2A is an elevation-view drawing (looking downstream) of a second embodiment 51 of the improved turbine-generator of this invention. Embodiment 51 includes two counter-rotating turbine-generators mounted on a frame 21 which is tethered to the bottom (not shown) of the body of water with a tether 22. FIG. 2B is a plan-view drawing of embodiment 51, and FIG. 3 is a block diagram illustrating a control system 51c for turbine-generator system (also 51). The two turbine-generators 1 of system 51, mounted on frame 21, are identical to the single turbine-generator of FIG. 1C and require no additional description here. (Various embodiments of the turbine-generator system of this invention include a frame. Note that each of these frames, all designated by reference number 21, may differ in structure but serve the same purpose, and thus are identified as frame 21.)

The block diagram of FIG. 3 shows control system 51c for turbine-generator system 51. Electronic controller 26 (software or firmware programmed) receives feedback signals from roll sensor 18 and pitch sensor 20. In turn, controller 26 sends control signals to rectifiers 27, 28, each of which are associated with one of turbine-generators 1. If feedback signals from sensors 18 and 20 indicate that turbine-generator system 51 has moved from its desired position and/or orientation, controller 26 commands rectifiers 27, 28 to raise or lower, as appropriate, power outputs 29 of the associated turbine-generators 1 in order to correct the position and orientation of turbine-generator system 51. Such power-output control is achieved in each turbine-generator 1 by controlling the electrical current flowing through its associated coils 9, resulting in changing output power levels 29 of each turbine-generator 1. The resulting torque changes of each turbine-generator 1 balance the torque on turbine-generator system 51 to hold the roll orientation (keeping both turbine-generators 1 at the same elevation) at its desired control point and to control overall power output 35 which, in turn, determines the pitch orientation (keeping frame 21 at a desired elevation) of turbine-generator system 51.

Note that embodiment 51 and all other embodiments of turbine-generator systems disclosed herein are designed to be buoyant such that the systems naturally rise in the water. Also note that the generators of turbine-generator system 51 (and all other embodiments of turbine-generator systems disclosed herein) are DC generators as defined above in this document.

Figures 4A, 4B:
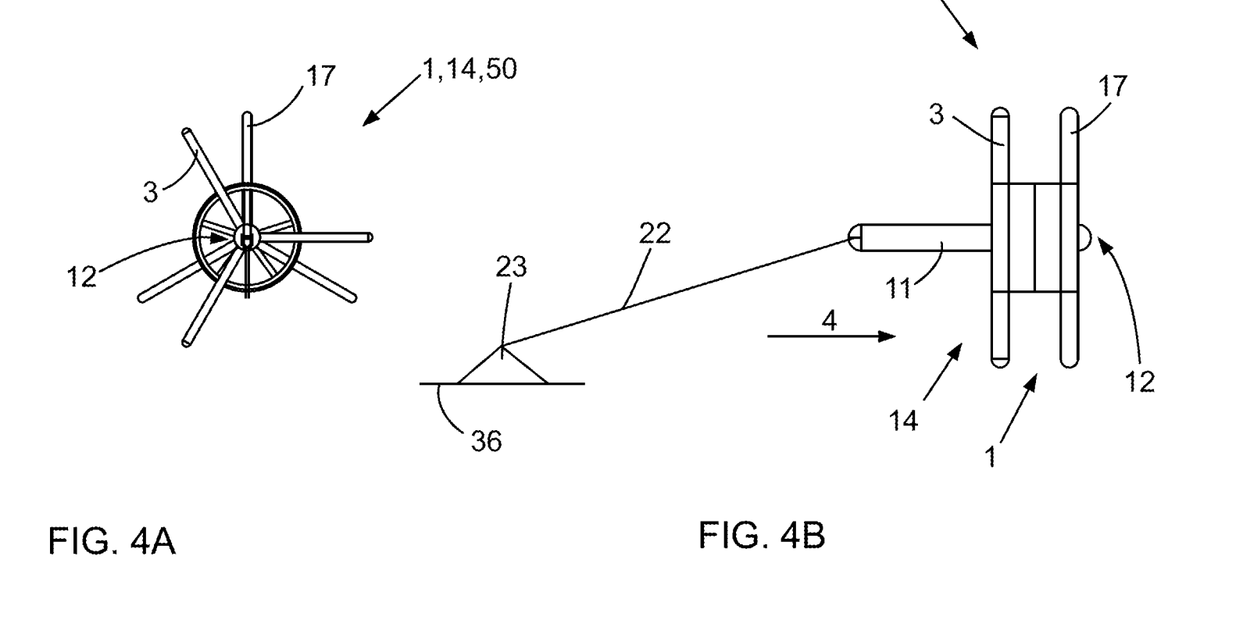
FIG. 4A is an elevation-view drawing (looking downstream) of the two-turbine-generator system of FIGS. 1A and 1B.
FIG. 4B is an elevation-view drawing (through the plane of the flow) of the turbine-generator system of FIG. 4A.
Figure 5:
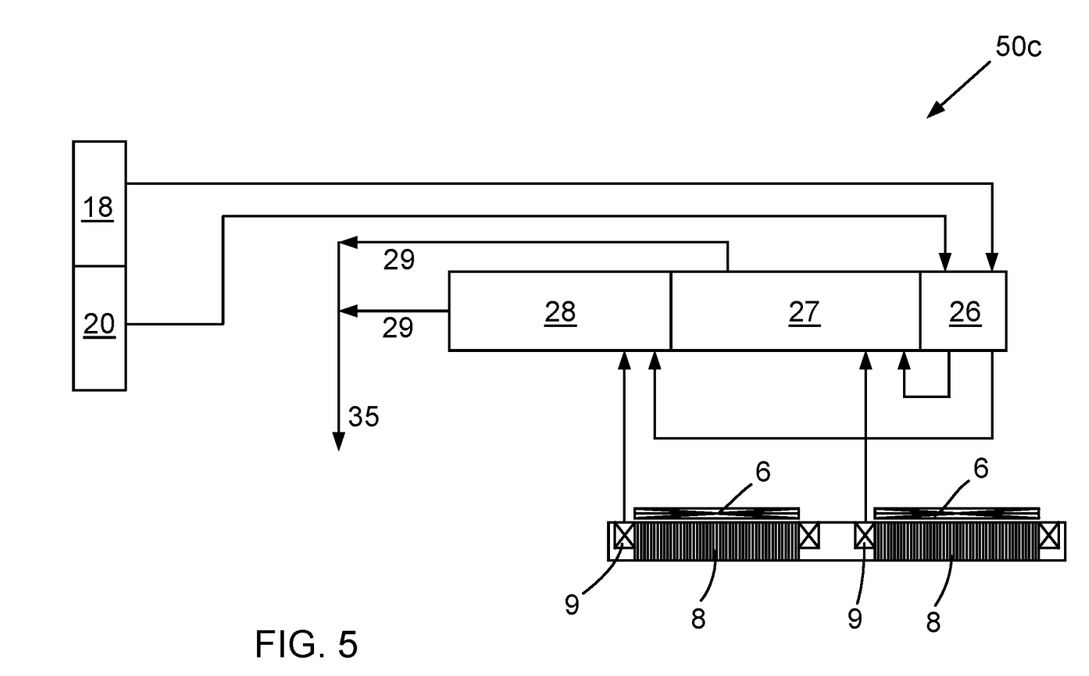
FIG. 5 is a block diagram illustrating the control system for the turbine-generator system of FIG. 4A.

FIG. 4A is an elevation-view drawing (looking downstream) of turbine-generation system 50; FIG. 4B is an elevation-view drawing (through the plane of the flow) of turbine-generator system 50; and FIG. 5 is a block diagram illustrating a control system 50c for turbine-generator system 50. Turbine-generator system 50 is tethered to a mooring 23 on the bottom 36 of the body of water by tether 22.

The block diagram of FIG. 5 shows control system 50c for turbine-generator system 50. As mentioned above in describing turbine-generator system 50, turbine-generators 1, 14 are counter-rotating and mounted on a common shaft (not shown) as indicated in FIG. 5 by the connected position of coils 9. Electronic controller 26 (software or firmware programmed) receives feedback signals from roll sensor 18 and pitch sensor 20. In turn, controller 26 sends control signals to rectifiers 27, 28, each of which are associated with one of turbine-generators 1, 14. If feedback signals from sensors 18 and 20 indicate that turbine-generator system 50 has moved from its desired position and/or orientation, controller 26 commands rectifiers 27, 28 to raise or lower, as appropriate, power outputs 29 of the associated turbine-generators 1 in order to correct the position and orientation of turbine-generator system 50. Such power-output control is achieved in each turbine-generator 1, 14 by controlling the electrical current flowing through corresponding coils 9, resulting in changing output power levels 29 of each turbine-generator 1, 14. The resulting torque changes of each turbine-generator 1, 14 balance the torque on turbine-generator system 50 to hold the roll orientation of body 11 at its desired control point and to control overall power output 35 which, in turn, determines the pitch orientation (keeping body 11 at a desired elevation) of turbine-generator system 50.

Figure 6A:
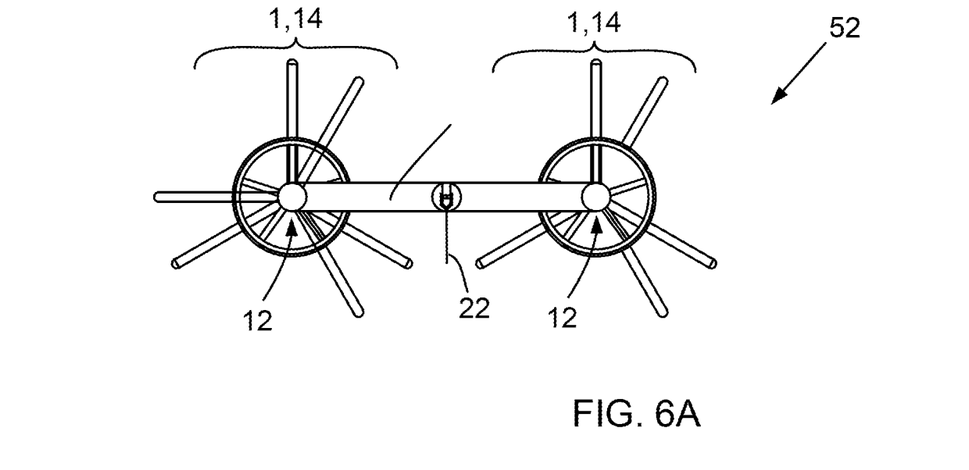
FIG. 6A is an elevation-view drawing (looking downstream) of a third embodiment of a turbine-generator system of this invention. Such embodiment has two pairs of counter-rotating turbine-generators, each pair having its own common shaft.
Figure 6B:
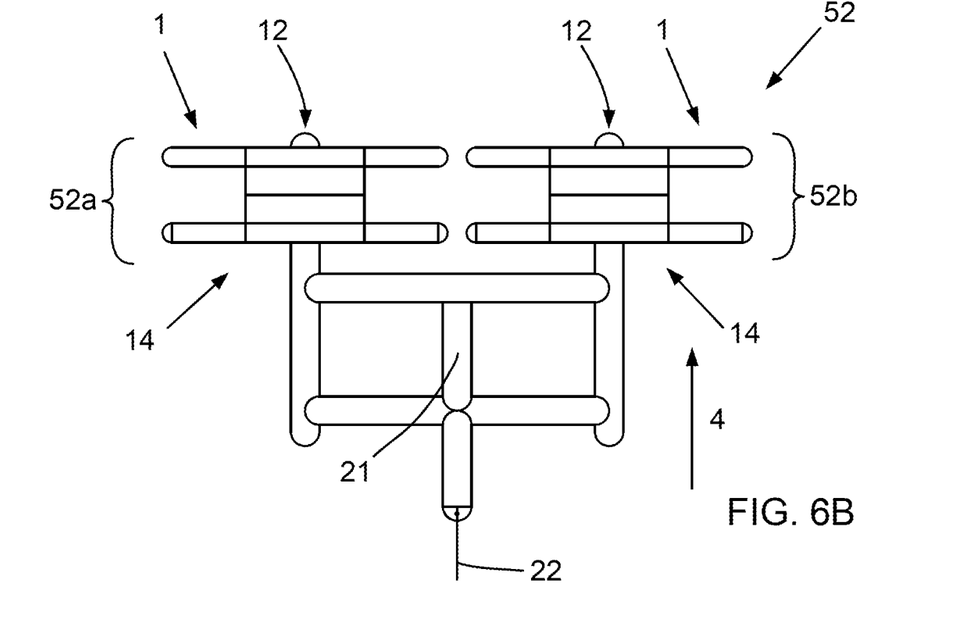
FIG. 6B is an elevation-view drawing (through the plane of the flow) of the turbine-generator system of FIG. 6A.

FIG. 6A is an elevation-view drawing (looking downstream) of an embodiment 52 of the turbine-generator system of this invention. Embodiment 52 has two pairs (52a and 52b) of counter-rotating turbine-generators 1, 14, pairs 52a and 52b each having a common shaft 12 and mounted on frame 21. Turbine-generator system (also 52) is tethered to a mooring (not shown) by tether 22. FIG. 6B is an elevation-view drawing (through the plane of the flow) of turbine-generator system 52, and FIG. 7 is a block diagram illustrating a control system 52c for turbine-generator system 52.

Figure 7:
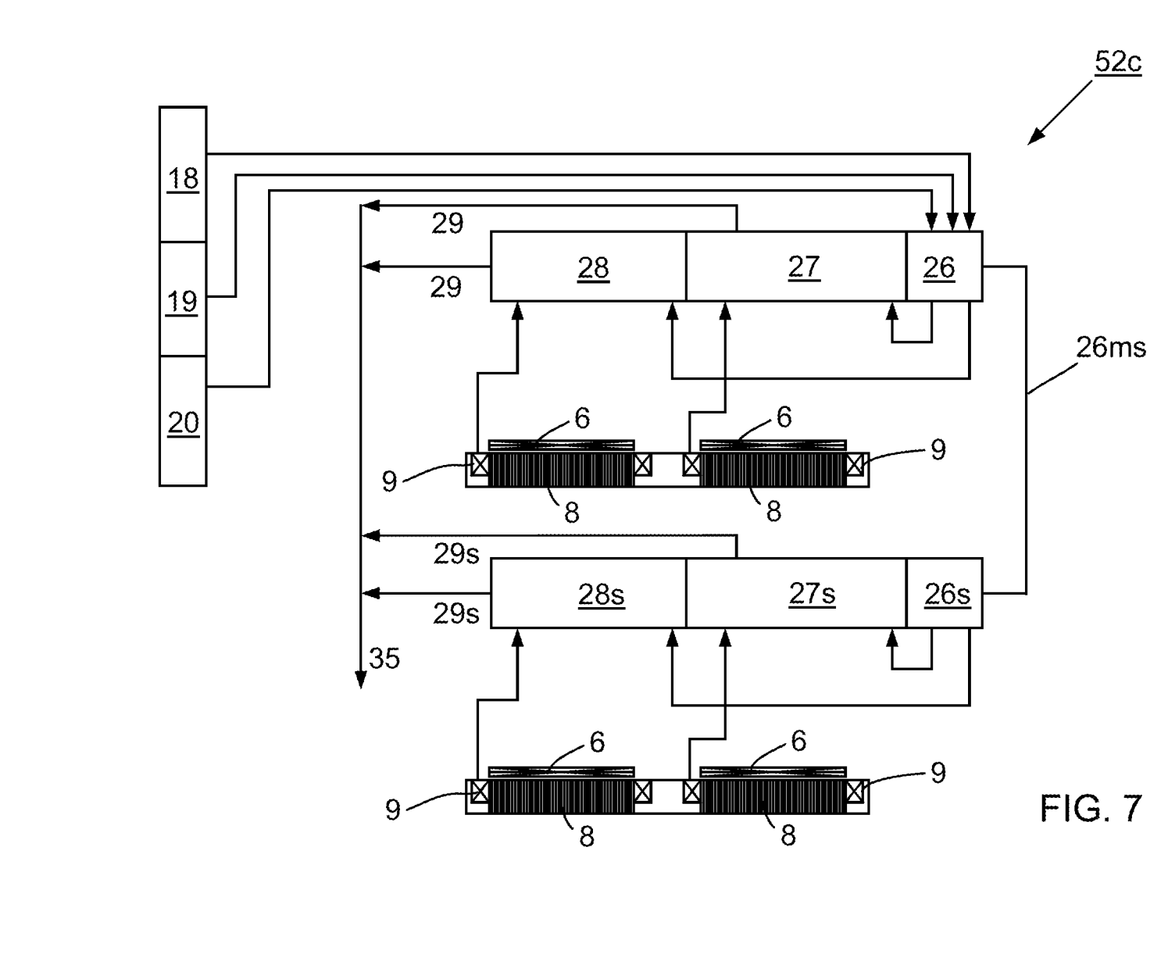
FIG. 7 is a block diagram illustrating the control system for the turbine-generator system of FIG. 6A.

The block diagram of FIG. 7 shows control system 52c for turbine-generator system 52. Turbine-generators 1, 14 in each pair 52a and 52b are counter-rotating and mounted on common shafts (not shown) as indicated in FIG. 7 by the connected position of the pairs of coils 9. Electronic controller 26 (software or firmware programmed) receives feedback signals from roll sensor 18, yaw sensor 19 and pitch sensor 20. A slave controller 26s (software or firmware programmed) is associated with one of pairs 52a, 52b, and controller 26 is associated with the other of such pairs. Controller 26 serves as a master controller in turbine-generator system 52, and controllers 26 and 26s are linked by electronic connection 26 ms. Controllers 26 and 26s send control signals to rectifiers 27, 28 and 27s and 28s, respectively, each pair of rectifiers being associated with its corresponding pair 52a, 52b of turbine-generators 1, 14. If feedback signals from sensors 18, 19 and 20 indicate that turbine-generator system 52 has moved from its desired position and/or orientation, controllers 26 and 26s command rectifiers 27, 28 (and 27s and 28s) to raise or lower, as appropriate, power outputs 29, 29s of associated turbine-generators 1, 14 in order to correct the position and orientation of turbine-generator system 52. Such power-output control is achieved in each turbine-generator 1, 14 and turbine-generator pair 52a, 52b by controlling the electrical current flowing through corresponding coils 9, resulting in changing output power levels 29, 29s of each turbine-generator 1, 14 as required. The resulting net torque changes of each pair 52a, 52b of turbine-generators 1, 14 balance the torque on turbine-generator system 52 to hold the roll orientation of frame 21 at its desired control point and to control overall power output 35 which, in turn, determines the pitch orientation (keeping frame 21 at a desired elevation) of turbine-generator system 52. The yaw orientation of frame 21 is controlled by controlling the power output of each pair 52a, 52b of turbine-generators 1, 14.

Figure 8A:
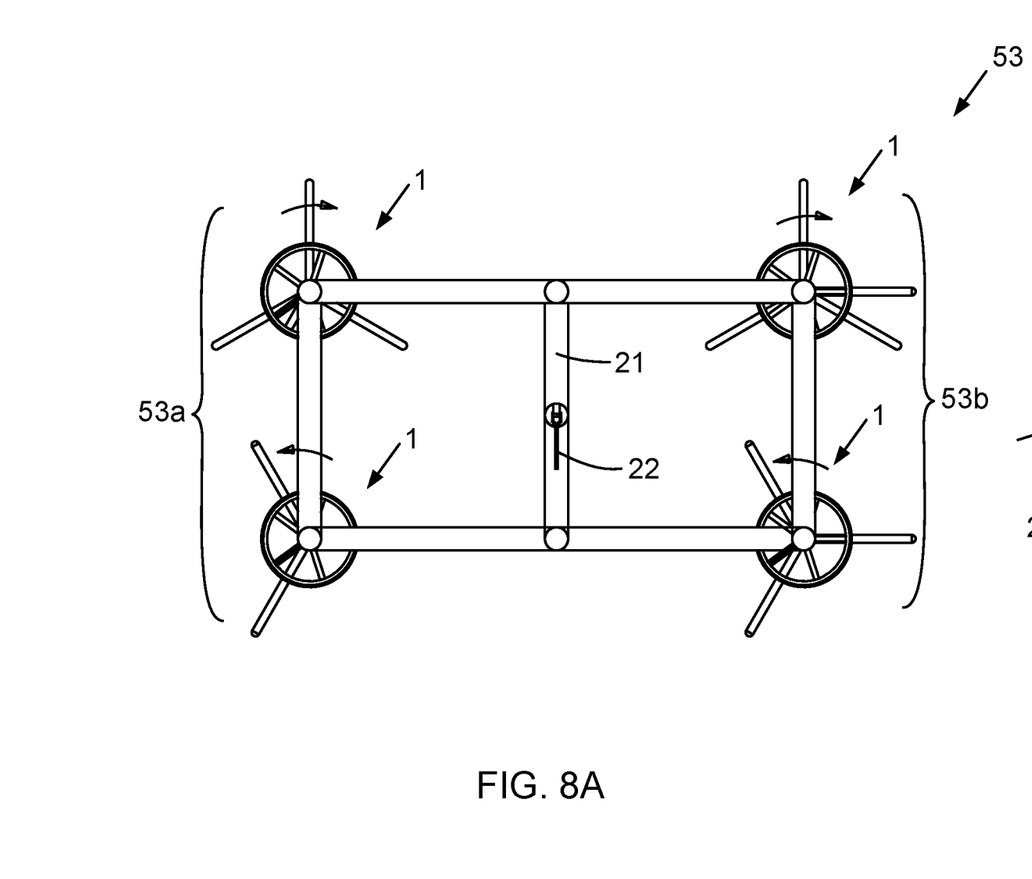
FIG. 8A is an elevation-view drawing (looking downstream) of a fourth embodiment of the turbine-generator system of this invention. Such embodiment has an array of four turbine-generators individually mounted on a frame.
Figure 8B:
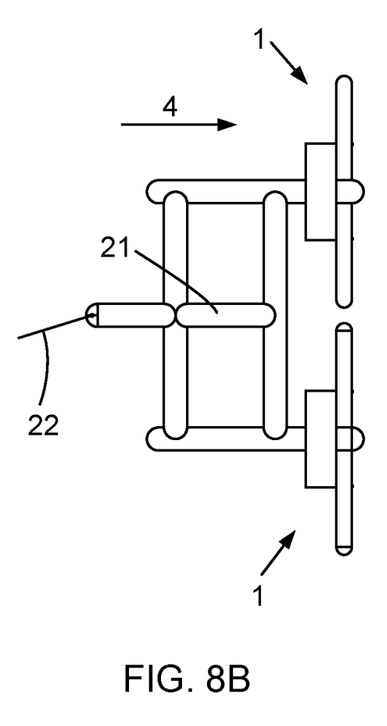
FIG. 8B is an elevation-view drawing (through the plane of the flow) of the turbine-generator system of FIG. 8A.
Figure 9:
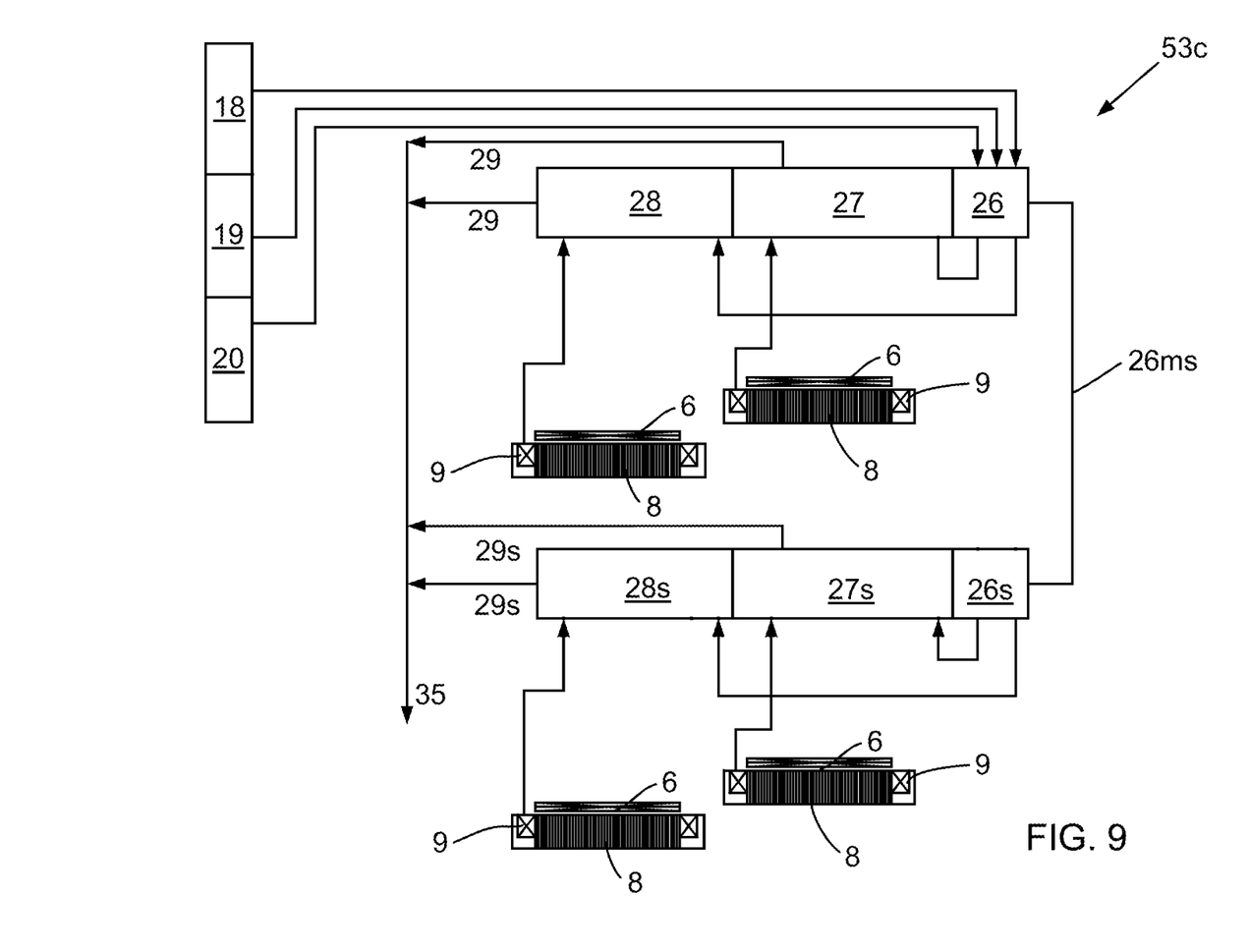
FIG. 9 is a block diagram illustrating the control system for the turbine-generator system of FIG. 8A.

FIG. 8A is an elevation-view drawing (looking downstream) of an embodiment 53 of the turbine-generator system of this invention. Embodiment 53 has an array of four single turbine-generators 1 individually mounted on frame 21. FIG. 8B is an elevation-view drawing (through the plane of the flow) of turbine-generator system (also 53), and FIG. 9 is a block diagram illustrating a control system 53c for turbine-generator system 53. Embodiment 53 has four individual turbine-generators 1 arranged in two pairs (53a and 53b) of counter-rotating turbine-generators 1 and mounted on frame 21. Turbine-generator system 53 is tethered to a mooring (not shown) by tether 22.

The block diagram of FIG. 9 shows control system 53c for turbine-generator system 53. Two turbine-generators 1 in each pair 53a and 53b are counter-rotating but not on common shafts as indicated in FIG. 9 by the unconnected position of the pairs of coils 9. Electronic controller 26 (software or firmware programmed) receives feedback signals from roll sensor 18, yaw sensor 19 and pitch sensor 20. Slave controller 26s (software or firmware programmed) is associated with one of pairs 53a, 53b, and controller 26 is associated with the other of such pairs. Controller 26 serves as a master controller in turbine-generator system 52, and controllers 26 and 26s are linked by electronic connection 26 ms.

Controllers 26 and 26s send control signals to rectifiers 27, 28 and 27s, 28s, respectively, each pair of rectifiers being associated with its corresponding pair 53a or 53b of turbine-generators 1, 14. If feedback signals from sensors 18, 19 and 20 indicate that turbine-generator system 53 has moved from its desired position and/or orientation, controllers 26 and 26s command rectifiers 27, 28 (and 27s, 28s) to raise or lower, as appropriate, power outputs 29, 29s of associated turbine-generators 1 in order to correct the position and orientation of turbine-generator system 53. Such power-output control is achieved in each turbine-generator 1 and turbine-generator pair 53a, 53b by controlling the electrical current flowing through corresponding coils 9, resulting in changing output power levels 29, 29s of each turbine-generator 1 as required. The resulting net torque changes of each pair 53a, 53b of turbine-generators 1 balance the torque on turbine-generator system 53 to hold the roll orientation of frame 21 at its desired control point and to control overall power output 35 which, in turn, determines the pitch orientation (keeping frame 21 at a desired elevation) of turbine-generator system 53. The yaw orientation of frame 21 is controlled by controlling the power output of each pair 53a, 53b of turbine-generators 1.

Figure 10A:
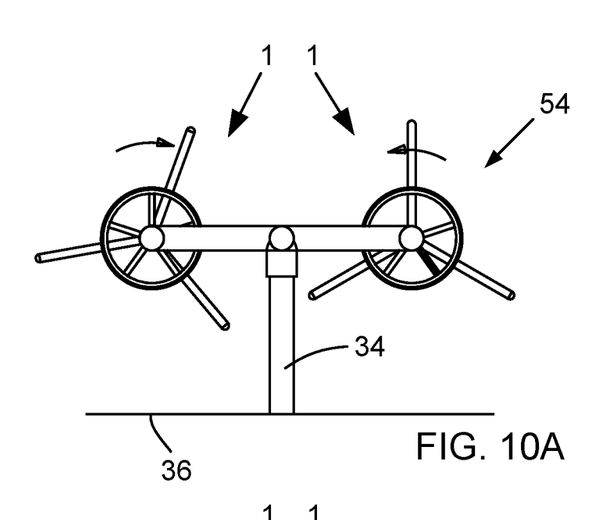
FIG. 10A is an elevation-view drawing (looking downstream) of a fifth embodiment of the turbine-generator system of this invention. Such embodiment has two turbine-generators mounted on opposite ends of a tower-supported frame.
Figure 10B:
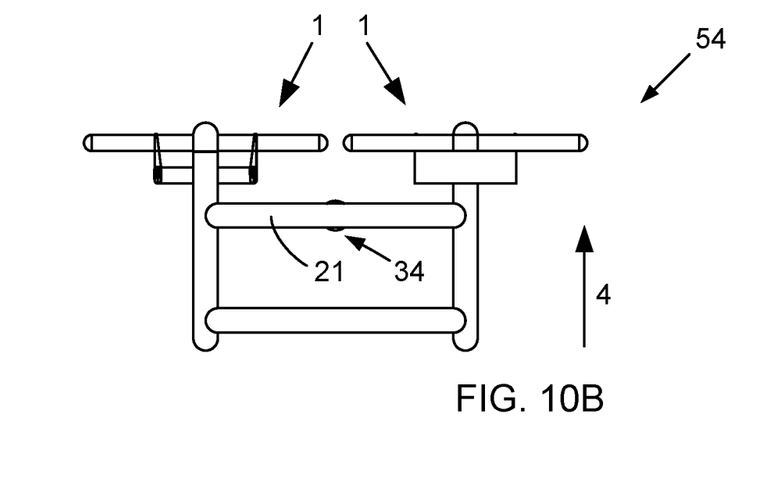
FIG. 10B is a plan-view drawing of the turbine-generator system of FIG. 10A.
Figure 10C:
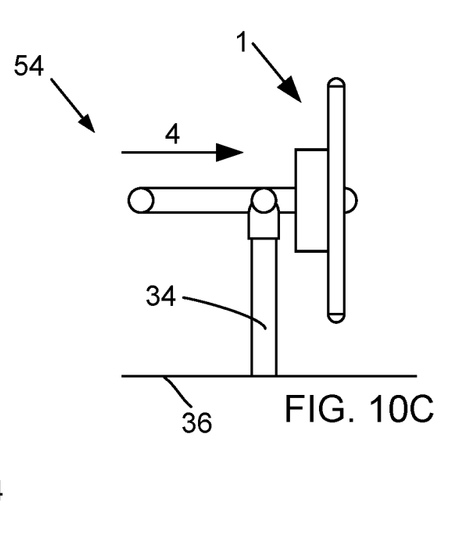
FIG. 10C is an elevation-view drawing (through the plane of the flow) of the turbine-generator system of FIG. 10A.
Figure 11:
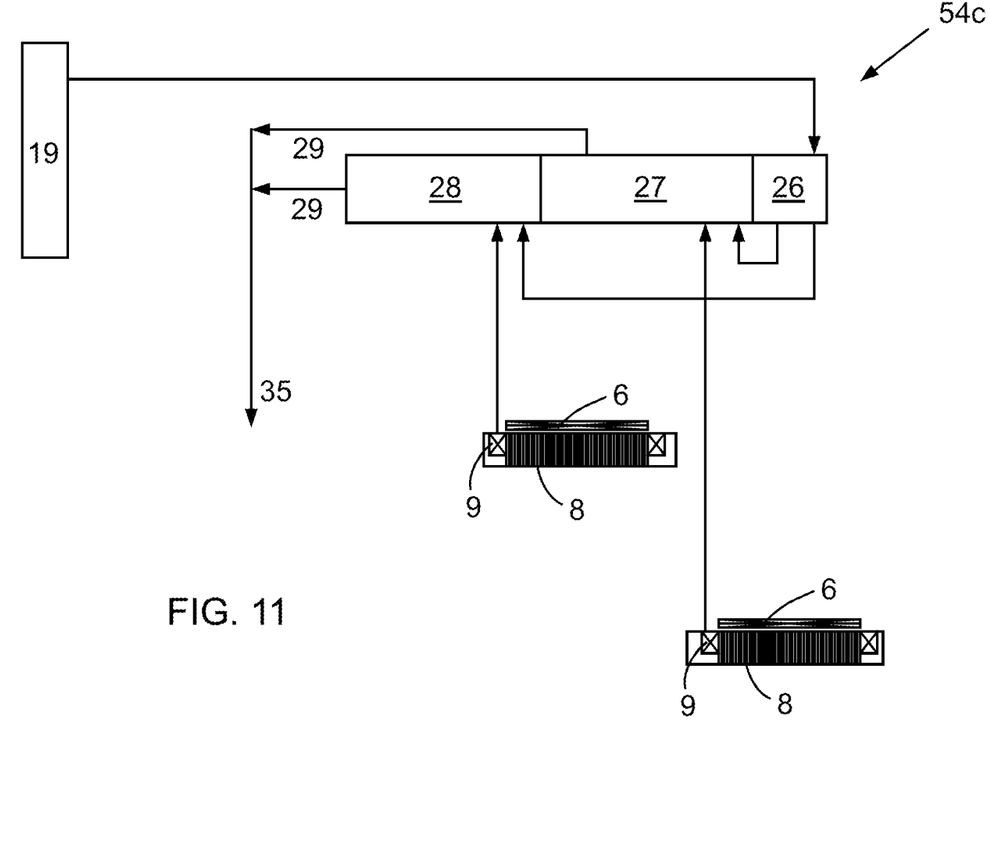
FIG. 11 is a block diagram illustrating the control system for the turbine-generator system of FIG. 10A.

FIG. 10A is an elevation-view drawing (looking downstream) of an embodiment 54 of the turbine-generator system of this invention. Embodiment 54 has two turbine-generators 1 level-mounted on opposite ends of a tower 34 (on bottom 36 of the body of water) on which frame 21 is supported (see FIGS. 10B and 10C). FIG. 10B is a plan-view drawing of turbine-generator system (also 54), and FIG. 10C is an elevation-view drawing (through the plane of the flow) of turbine-generator system 54. FIG. 11 is a block diagram illustrating a control system 54c for turbine-generator system 54. Although not necessary, it is beneficial to set up turbine-generators 1 as counter-rotating.

The block diagram of FIG. 11 shows control system 54c for turbine-generator system 54. Electronic controller 26 (software or firmware programmed) receives a feedback signal from yaw sensor 19. In turn, controller 26 sends control signals to rectifiers 27, 28, each of which are associated with one of turbine-generators 1. If the feedback signal from sensor 19 indicates that turbine-generator system 54 has moved from its desired yaw orientation, controller 26 commands rectifiers 27, 28 to raise or lower, as appropriate, power outputs 29 of the associated turbine-generators 1 in order to correct the yaw orientation of turbine-generator system 54. Such power-output control is achieved in each turbine-generator 1 by controlling the electrical current flowing through corresponding coils 9, resulting in changing output power levels 29 of each turbine-generator 1. The resulting torque changes of each turbine-generator 1 balance the torque on turbine-generator system 54 to hold the yaw orientation at its desired control point and to control overall power output 35 of turbine-generator system 54. Yaw control becomes important when tidal changes are present which vary flow direction 4 on a cyclical basis. The specific control function under such radical changes in flow direction 4 is achieved by allowing one of turbine-generators 1 to free-wheel until turbine-generator system 54 is oriented close to the new yaw control point. Reversing the direction of this change each time may eliminate the need for slip rings within tower 34.

While the principles of this invention have been described in connection with specific embodiments, it should be understood clearly that these descriptions are made only by way of example and are not intended to limit the scope of the invention.

The invention claimed is:

1. A hydrokinetic turbine-generator system comprising more than one turbine-generator aligned into a water stream for conversion of hydrokinetic energy to electrical energy, wherein the turbine-generators are direct-drive electrical generators each of which includes a controller configured to use electronic torque control to vary generator power-output by controlling electrical current in the corresponding turbine-generator during power generation such that torque on the system is balanced, whereby system orientation is controlled continuously while power is being generated.

2. The hydrokinetic turbine-generator system of claim 1 wherein the more than one turbine-generator includes one or more pairs of counter-rotating turbine-generators, each pair being mounted on an associated common shaft.

3. The hydrokinetic turbine-generator system of claim 2 wherein each of the more than one turbine-generator has an armature, and each of the turbine-generator pairs has the armatures combined into a single component.

4. The hydrokinetic turbine-generator system of claim 3 wherein each turbine-generator of each pair of turbine-generators has (a) a plurality of turbine blades each having a blade tip and (b) generator components including a plurality of permanent magnets and the associated armature, and the turbine-generators of each pair share a common turbine-generator body.

5. The hydrokinetic turbine-generator system of claim 1 wherein the direct-drive electrical generators include water-lubricated bearings.

6. The hydrokinetic turbine-generator system of claim 1 wherein the system is moored using a single-point mooring.

7. The hydrokinetic turbine-generator system of claim 6 wherein the electronic torque control includes control of system pitch, yaw and roll.

8. The hydrokinetic turbine-generator system of claim 1 wherein the electronic torque control includes control of system pitch and roll.

9. The hydrokinetic turbine-generator system of claim 1 wherein the electronic torque control includes control of system yaw.

10. The hydrokinetic turbine-generator system of claim 1 wherein the more than one turbine-generator each has (a) a plurality of turbine blades each having a blade tip, (b) a turbine-generator body including a bearing, and (c) generator components including a plurality of permanent magnets and an armature, the generator components of each turbine-generator being located outside of the turbine-generator body.

* * * * *